United States Patent [19]

Gibert

[11] 4,318,664
[45] Mar. 9, 1982

[54] SELF-STABILIZING LOAD LIFTING AND HANDLING VEHICLE

[76] Inventor: Pierre Gibert, 3, rue Victor Duruy, 75015 Paris, France

[21] Appl. No.: 152,064

[22] Filed: May 20, 1980

[51] Int. Cl.³ .................... B62D 53/02; E02F 3/72
[52] U.S. Cl. ............................ 414/719; 414/685; 180/209; 298/20 R
[58] Field of Search .......... 280/638, 649, 650, 656, 280/43.23, 400; 298/20 R, 22 J; 414/632, 634, 685, 719; 212/189, 195; 180/21, 209

[56] References Cited

U.S. PATENT DOCUMENTS

| | | | |
|---|---|---|---|
| 2,168,905 | 8/1939 | Lear | 280/638 |
| 2,905,348 | 9/1959 | Backofen | 280/638 X |
| 3,036,651 | 5/1962 | Paul | 254/2 C |
| 3,158,462 | 11/1964 | Clement | 298/20 R |
| 3,485,505 | 12/1969 | Schmidt | 280/638 X |
| 3,670,910 | 6/1972 | Shaw | 280/638 X |
| 4,042,274 | 8/1977 | Cabagnero | 280/650 X |

FOREIGN PATENT DOCUMENTS 947286  1/1964  Fed. Rep. of Germany .

Primary Examiner—Trygve M. Blix
Assistant Examiner—Terrance L. Siemens
Attorney, Agent, or Firm—Dowell & Dowell

[57] ABSTRACT

The present invention relates to a self-stabilizing load lifting and handling vehicle, wherein the chassis thereof is composed of two elements bearing, respectively, the rear axle and the front axle, these two elements being pivoted on each other about a horizontal pivot pin located above and parallel to the axles, in linear travel position.

3 Claims, 3 Drawing Figures

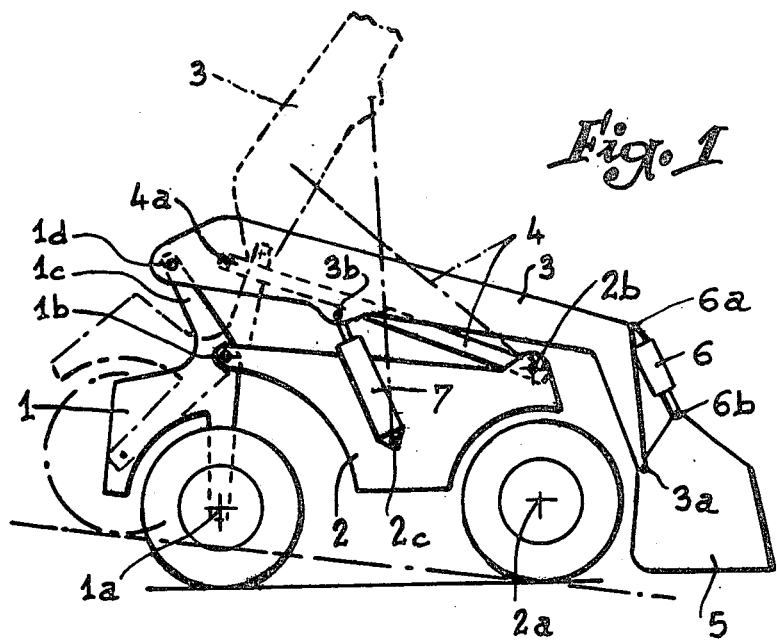
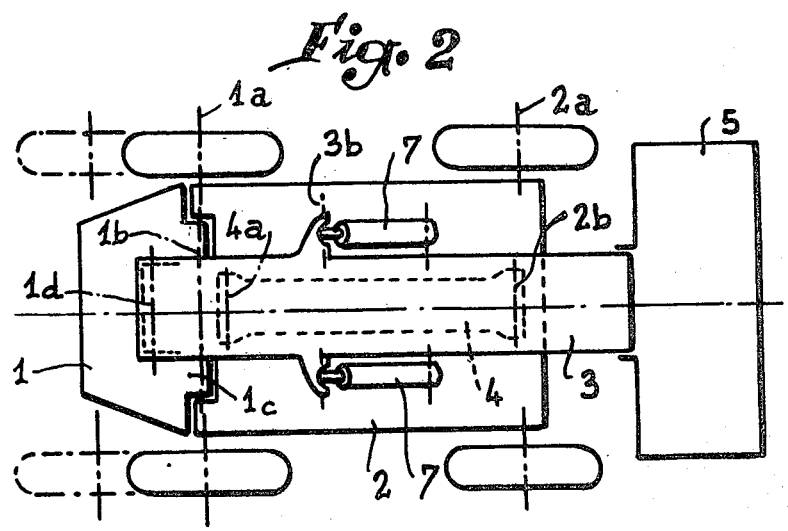

SELF-STABILIZING LOAD LIFTING AND HANDLING VEHICLE

The present invention relates to a vehicle for lifting and handling loads, which is self-stabilizing as it enables both the length of the polygon of stability (wheelbase) of the vehicle to be increased and the position of the centre of gravity of this vehicle to be improved, thus increasing stability, this self-stabilization being automatic as the load is being lifted.

Load lifting and handling vehicles are already known which are composed of articulated arms, movable in the vertical plane under the thrust of one or more jacks. These arms bear at one of their ends a load bearing element. These vehicles generally carry the load in front, therefore in overhang with respect to their front axle.

Their stability is obtained by acting on two factors:
the wheelbase which must be as large as possible,
their mass which must also be as large as possible.

However, the large wheelbase requires a great deal of space for manoeuvering and takes up more storage surface in the warehouses. As for the mass, it requires a correspondingly powerful drive.

On the other hand, the stability of these vehicles is never as great as desired, particularly when loads are positioned or removed at height.

It is an object of the present invention to remedy these drawbacks and to solve the problem of vehicle stability by:
an automatic increase of the length of the polygon of stability of the vehicle as the load is being lifted;
the automatic moving back of the centre of gravity of the apparatus, thus increasing stability thereof.

The advantages obtained due to this invention consist essentially:
in a vehicle of small dimensions in travel position, therefore economising as to the surface reserved for vehicles in the warehouses;
for a given load to be lifted, in a reduced vehicle weight, therefore less power is necessary, and consequently the manufacturing and utilization costs are reduced;
in "high load" manoeuvering safety which is considerably improved with respect to conventional apparatus.

The invention will be more readily understood on reading the following description with reference to the accompanying drawings, in which:

FIG. 1 is a side view of the vehicle according to the invention.

FIG. 2 is a plan view of this same vehicle.

Figure 3:
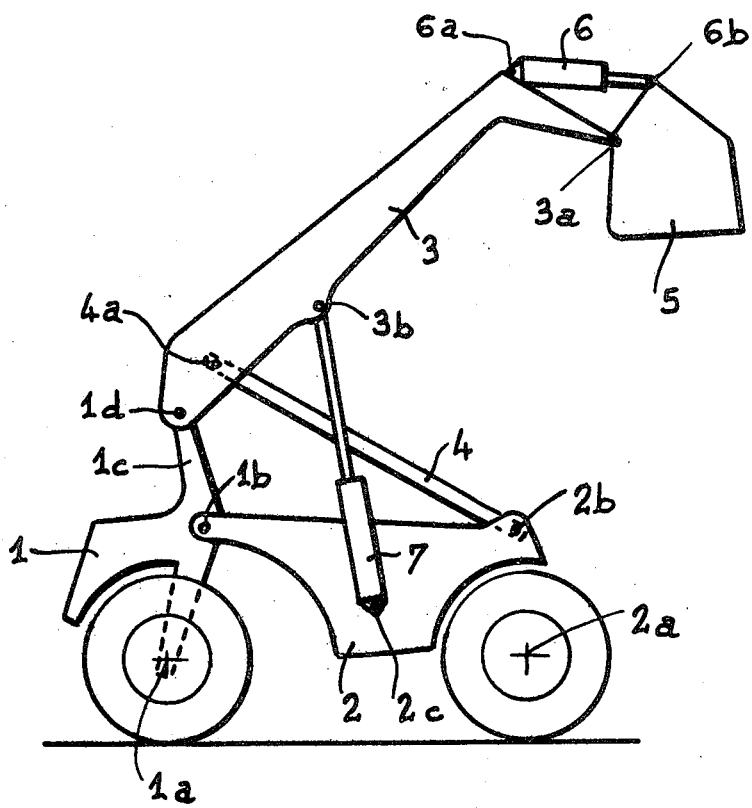
FIG. 3 is a side view of the embodiment of the apparatus.

Referring now to the drawings, FIGS. 1 to 3 show the vehicle according to the invention which comprises a chassis composed of two elements: a rear element 1, supporting the rear axle 1a and a front element 2 supporting the front axle 2a, these two elements being pivoted with respect to each other about a chassis pivot pin 1b parallel to the axis of each of these two axles 1a and 2a in linear travel position, so as to allow these two axles 1a and 2a to move away from or approach each other by pivoting about pin 1b.

The rear element 1 supports the rear axle 1a located parallel to the pivot pin 1b: an arm 1c forming part of this rear element, and therefore also fixed with respect to the axle 1a, is located above the chassis pivot pin 1b and bears a boom pivot pin 1d also parallel to pivot pin 1b.

The front element 2, supporting the front axle 2a, said axle being parallel, in linear travel position, to the pivot pin 1b, also bears a first pivot pin 2b parallel to the chassis pivot pin 1b and parallel to the front axle 2a in linear travel position.

A boom 3 is located above the chassis, composed of pivoted elements 1 and 2, parallel to the longitudinal axis of the chassis.

This boom 3 comprises at its rear end a boom pivot pin 1d common with that of the arm of the rear element of the chassis, thus allowing the boom 3 to move about this axis 1d in a vertical plane perpendicular to the axis 1b. This boom comprises at its other end, located at the front of the vehicle, a loader pivot pin 3a bearing the attachment for loading.

In the example shown, a bucket 5 is pivoted on the boom, about pivot pin 3a, under the control of a jack 6, via its pivot pins 6a and 6b respectively carried by the boom 3 and the bucket 5, enabling the latter to be inclined.

The boom 3 also includes a second pivot pin 4a parallel to pins 1d and 3a as well as to 1b, and located between pin 1d and pin 2b so that a connecting rod 4, itself comprising two bores located at its ends, couples the boom 3 to the front element 2 of the chassis, by receiving the pins 4a and 2b respectively in its bores.

Thus, the pins 1d, 4a, 2b, 1b and the connecting rod 4 allow the boom 3 to move in a vertical plane which is perpendicular thereto, this movement being effected under the thrust of the main jack 7, connected at 2c on the front element 2 of the chassis and at 3b on the boom 3.

The conventional deformable trapezoid, formed by: the arm 1c, bearing the pivot pins 1d and 1b, forming part of the rear element of the chassis 1; the front element 2, bearing the pivot pins 1b and 2b; the connecting rod 4, bearing the pivot pins 2b and 4a, and the boom 3, bearing the pivot pins 4a and 1d, all pins being parallel to one another, ensures that, under the thrust of the main jack 7, the boom 3 rises, maintained at the front by the connecting rod 4, and causes movement about pin 1b of the arm 1c towards the front of the vehicle. This arm forming part of the rear chassis element causes the lower part of the chassis element to move back, taking with it the axle 1a: thus, parallel in linear travel position, the axle 1a moves away from the front axle, hence the centre of gravity moves back at the same time as the wheelbase increases, as the boom is lifted, this contributing to ensuring the desired increase in safety.

Various modifications may of course be made by the man skilled in the art to the apparatus which has just been described solely by way of non-limiting example, without departing from the scope of the invention.

What is claimed is:

1. A self-stabilizing load lifting and handling vehicle, comprising:
a chassis having a front chassis element supporting a wheel-bearing front axle, and having a rear chassis element supporting a wheel-bearing rear axle, the chassis elements being coupled together by a chassis pivot pin, and the axles and pivot pin being disposed horizontally in the travel position of the vehicle with the pivot pin being located higher on the vehicle than the axles;

a boom disposed above the chassis and extending from a horizontal boom pivot pin near its rear end to a load supporting attachment near its front end, the boom pivot pin securing the boom to the rear chassis element at a location above the chassis pivot pin; and horizontal pivot means carried by the front chassis element and by the boom intermediate its ends, and said pivot means supporting means coupling the boom and the front chassis element and including means operative to raise the boom while pivoting the chassis elements to increase the spacing between said axles, and to lower the boom while pivoting the chassis elements to decrease said spacing.

2. A vehicle as claimed in claim 1, wherein the pivot means comprises first and second pivot pins located respectively on the front chassis element and on the boom, and wherein said coupling means includes a connecting rod connected between said first and second pivot pins, whereby the connecting rod and the front chassis element between its pivot pins and the boom between its pivot pins and the rear chassis element between its pivot pins together form a trapezoid in a vertical plane which deforms to increase and decrease said axle spacing as the boom is raised and lowered.

3. A vehicle as claimed in claim 2, wherein the coupling means further includes a main jack connected between the front chassis element and the boom and comprising said means operative to raise and lower the boom relative to the front chassis element to change said spacing between said axles.

* * * * *